June 17, 1947.  C. H. JUDD  2,422,420
CLOSURE DEVICE
Original Filed Nov. 22, 1943

INVENTOR.
CHARLES H. JUDD
BY
Bates, Teare & McKee
ATTORNEYS.

Patented June 17, 1947

2,422,420

UNITED STATES PATENT OFFICE 2,422,420

CLOSURE DEVICE

Charles H. Judd, Cleveland, Ohio, assignor to Tinnerman Products, Inc., Cleveland, Ohio, a corporation of Ohio Original application November 22, 1943, Serial No. 511,223. Divided and this application April 10, 1944, Serial No. 530,374

1 Claim. (Cl. 220—25)

This application is a division of my copending application Serial No. 511,223, filed November 22, 1943, which became Patent No. 2,402,556 on June 25, 1946, for a Closure device.

This invention relates to a closure device adapted to be very quickly applied to a structure from the exterior thereof to close an opening therein. More particularly, the invention provides a closure plate for the exterior of the opening, a bridge plate adapted to extend across the opening at the interior and carrying a nut, and a threaded bolt passing through the outer plate and threaded into the nut carried by the bridge plate so that when the parts are in place and the bolt is tightened the outer plate is clamped snugly across the opening. A feature of my device is that the bridge member is so formed that it may be readily passed through an opening in the structure and thereafter shifted to bridge the opening, and be seated tightly against the interior.

An object of the invention is to provide such a closure device in a form which may make a substantially flush closure for the opening. Such a flush closure means is especially important in closing external openings in airplanes (either those formed accidentally or those made intentionally to allow access to the interior) and in such cases it is very important that the amount of external projection to be reduced to the minimum to enable a substantially flush external surface.

Another object of my invention is to provide very ready means for preventing the nut member of the combination from rotating as the bolt is turned into place.

Figure 1:
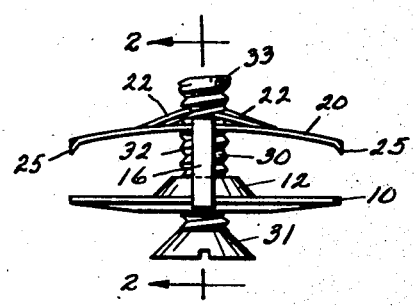
Figure 2:
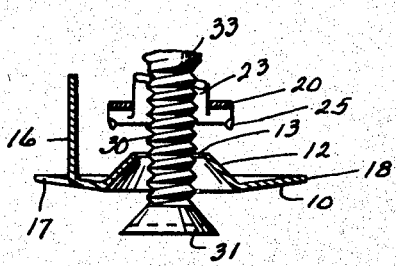
Figure 3:
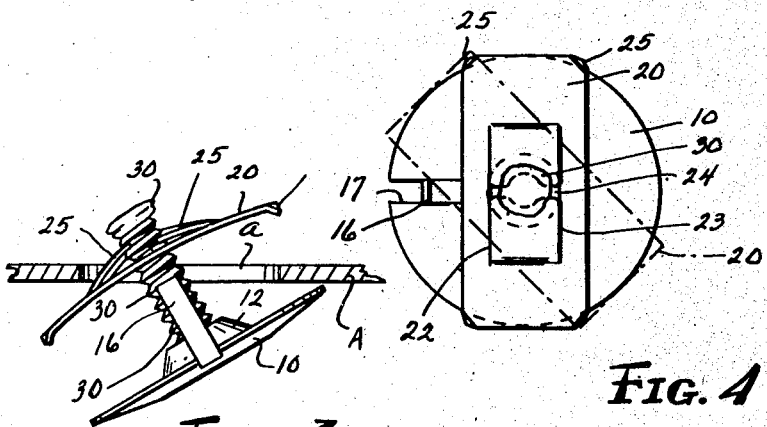
Figure 4:
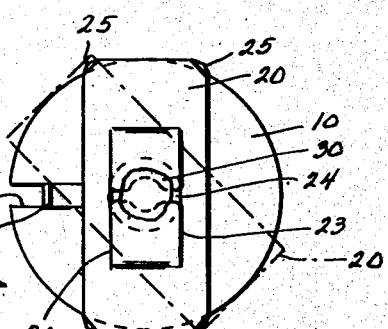
Figure 5:
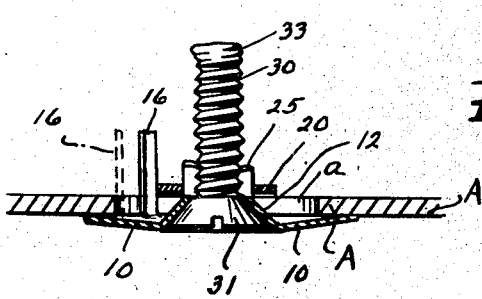

My invention is illustrated in the drawings hereof, in which Fig. 1 is a side elevation of the closure device; Fig. 2 is a cross section thereof in a plane and at a right angle to Fig. 1, as indicated by the line 2—2 on Fig. 1; Fig. 3 is a side elevation of the device in one of the intermediate positions it may have during insertion; Fig. 4 is a plan of the device showing in broken lines the relative position which the bridge plate may assume as the bolt is tightened; Fig. 5 is a sectional elevation of the device in tightened position on a structural plate.

As shown in Figs. 1 to 5 inclusive, the closure device comprises broadly a closure plate 10, a bridge plate 20, and a clamping bolt 30 threaded into the bridge plate.

The closure plate 10 is preferably a circular disc, slightly dished so that its peripheral edge only may contact with the surface of structure that is to be applied. This closure plate is formed with a frusto-conical inward extension 12, the central opening 13 of which is of the proper size for the free passage of the bolt shank. This closure plate is provided with a tongue 16 which is cut from the body of the plate, and from material beyond the finished periphery of the plate, by a radial notch 17, and then turned upwardly at approximately right angle to the general plane of the closure plate.

The bridge plate 20 is a parallel-sided member; that is, it is of approximately substantially rectangular form. This bridge plate is provided with a pair of tongues 22 partially severed from the body of the plate by parallel slits 23 and a transverse central opening 24, the tongues being then bent up at oblique angles. The tongues are notched at their ends and are warped in opposite directions so that their ends define a helical turn for the bolt. Preferably, the corners of the bridge plate 20 are bent down, as shown at 25, to provide anchorage prongs to engage the structure against which the parts are clamped.

The bolt 30 is formed with conical head 31 adapted to seat in the countersunk recess 12 of the closure plate and a shank 32 which carries a parallel thread. The inner end of the bolt shank is somewhat upset as shown at 33 to prevent separation of the parts when not in use. The conical head is preferably provided with a screw driver slot.

Before application, the fastener plate and bridge plate are separated a suitable distance on the shank to allow the bridge plate to be readily passed through an opening in the structure. Fig. 3 shows, for instance, a structural plate A having an opening a and shows the bridge plate being passed through such opening. The width of the bridge plate is slightly less than the diameter of the opening, and by tipping the device, as indicated in Fig. 3, the major portion of the bridge plate may be passed diagonally through the opening and then by swinging the device in a clockwise direction and shifting it toward the left in Fig. 3, the whole of the bridge plate may be passed through the opening. Then by shifting the device toward the right the rounded end 21 of the bridge plate will come beyond the right hand portion of the opening.

When the parts are positioned the tightening of the bolt brings the frusto-conical portion of the closure plate into the opening and causes the peripheral edge of such plate to engage the outer face of the structural member A. As the bolt is turned in the corner prongs 25 become embedded in the structure, and the tongue 16 engaging the side of the bridge plate prevents further turning of the closure plate; then as the clamping becomes tight, the tongues 23 are gradually sprung inwardly to obtain a very firm strut action against the bolt. At the same time the dished outer disc may be somewhat flattened. Thus when the parts are in their final position, the closure plate extends only slightly beyond the surface of the supporting plate A and leaves a substantially flush exterior.

The closure device of this invention is well adapted, for instance, for patching openings made in airplane walls, as, for instance, by passage of a bullet. To effect the repair it is only necessary to ream out the opening sufficiently for the passage of the bridge plate and then to insert the device and tighten it.

I claim:

A cover plate device adapted to be secured over an opening in a panel by application entirely from one side of the panel and in substantially flush relation with said panel, comprising, a cover plate in the form of a sheet metal disc adapted to be positioned over said panel opening at the forward side of the panel, said cover plate having a bolt passage and a countersink surrounding said bolt passage, an integral projection comprising a strip having a portion formed by radially slitting the periphery of the cover plate and bending it inwardly to project generally normal to the undersurface of said cover plate at a point spaced inwardly from the peripheral edge thereof, a sheet metal bridge plate having a bolt receiving opening and integral thread means comprising resilient thread engaging tongues stamped from the material of said bridge plate adjacent said bolt receiving opening, said bridge plate being adapted to pass through the panel opening from the forward side of the panel and bridge said opening at the rearward side of the panel, and a bolt extending through said bolt passage in the cover plate having a head receivable in the countersink therein in substantially flush relation with the cover plate, said bolt having a threaded connection with said integral thread engaging tongues on the bridge plate, and said projection on the cover plate being engageable with the bridge plate to prevent relative turning movement of the bridge plate when the bolt is rotated to tighten said cover plate and bridge plate in clamping relation with opposite sides of the panel adjacent said panel opening, said resilient thread engaging tongues on the bridge plate providing an automatic thread locking action on the bolt in tightened position to prevent loosening thereof as a result of vibratory motion or the like.

CHARLES H. JUDD.

REFERENCES CITED

The following references are of record in the file of this patent:

UNITED STATES PATENTS

| Number | Name | Date |
|---|---|---|
| 2,335,906 | Blinn | Dec. 7, 1943 |
| 943,338 | Carter et al. | Dec. 14, 1909 |
| 1,216,771 | Booth | Feb. 20, 1917 |
| Re. 16,858 | Klein et al. | Jan. 24, 1928 |
| 2,198,439 | Kost | Apr. 23, 1940 |
| 2,293,399 | Moecker et al. | Aug. 18, 1942 |
| 261,947 | Murphy | Aug. 1, 1882 |
| 2,149,359 | Olson | Mar. 7, 1939 |

FOREIGN PATENTS

| Number | Country | Date |
|---|---|---|
| 16,474 | Great Britain | Sept. 1, 1893 |